US007739469B2

(12) United States Patent
Jessani et al.

(10) Patent No.: US 7,739,469 B2
(45) Date of Patent: Jun. 15, 2010

(54) PATCHING ROM CODE

(75) Inventors: Romesh Mangho Jessani, Austin, TX (US); Antonio Torrini, Austin, TX (US); Robert Koelling, Austin, TX (US); David Baker, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1029 days.

(21) Appl. No.: 11/268,827

(22) Filed: Nov. 8, 2005

(65) Prior Publication Data

US 2007/0198787 A1    Aug. 23, 2007

(51) Int. Cl.
G06F 12/00 (2006.01)
G06F 12/02 (2006.01)
G06F 12/12 (2006.01)

(52) U.S. Cl. .................. 711/165; 711/103; 711/170; 717/168

(58) Field of Classification Search .............. 711/103, 711/165, 170; 717/168
See application file for complete search history.

(56) References Cited

U.S. PATENT DOCUMENTS

| 4,610,000 | A  | * | 9/1986 | Lee ..................... 365/189.02 |
| 5,802,549 | A  | * | 9/1998 | Goyal et al. ............. 711/102 |
| 5,938,766 | A  | * | 8/1999 | Anderson et al. ......... 713/100 |
| 6,260,157 | B1 | * | 7/2001 | Schurecht et al. ........... 714/8 |
| 6,925,521 | B2 | * | 8/2005 | Li et al. ................. 711/103 |
| 6,931,477 | B2 | * | 8/2005 | Oakley et al. .............. 711/2 |
| 7,039,776 | B2 | * | 5/2006 | Wong et al. ............. 711/159 |
| 2002/0010846 | A1 | * | 1/2002 | Weber et al. ............. 711/165 |
| 2009/0013124 | A1 | * | 1/2009 | Itkin ..................... 711/103 |

OTHER PUBLICATIONS

Sherwood, T. and Calder, B. 2001. Patchable instruction ROM architecture. In Proceedings of the 2001 international Conference on Compilers, Architecture, and Synthesis For Embedded Systems (Atlanta, Georgia, USA, Nov. 16-17, 2001). CASES '01. ACM, New York, NY, 24-33.*

* cited by examiner

*Primary Examiner*—Sanjiv Shah
*Assistant Examiner*—Samuel Dillon
(74) *Attorney, Agent, or Firm*—Gary R. Stanford

(57) ABSTRACT

An instruction set is executed from Read Only Memory (ROM). When a current instruction in the instruction set corresponds to a reserved patch memory block of ROM, a Random Access Memory (RAM) index and a ROM return address are loaded into a memory map, and a program counter is set to a first reserved ROM address. After jumping the program counter to the first reserved ROM address, the program counter is jumped to RAM based on the RAM index to execute a patch code, which includes at least one instruction to set the program counter to a second reserved ROM address. When the program counter equals the second reserved ROM address, the ROM return address is retrieved. Then the instruction set is executed from ROM based on the ROM return address.

20 Claims, 7 Drawing Sheets system on chip 100

PATCHING ROM CODE

BACKGROUND OF THE INVENTION

1. Technical Field of the Invention

This invention relates generally to Read Only Memory (ROM) and more particularly to a method, apparatus and system for patching ROM code in a digital data processing system.

2. Description of Related Art

As is known, digital data processing systems such as computers, personal media players (e.g., mp3 players), cell phones, and other electronic devices typically use digital data processors, read only memory (ROM), and random access memory (RAM) in their operation. On startup and in operation of a microprocessor, operating code in a ROM is accessed to run operating code. For example, on startup of a personal computer, ROM code is accessed to load initial program instructions, such as boot and initialization instructions.

The way a ROM chip works necessitates the programming of perfect and complete data when the chip is created. By the nature of the ROM structure, it is impossible to reprogram or rewrite a standard ROM chip. For example, if the operating code is incorrect, or the data needs to be updated, the ROM chip must be discarded and replaced with a new chip having replacement code. Creating the original template for a ROM chip is often a laborious process full of trial and error, so replacing or changing merely a single line of ROM code once a template is produced can be a massive undertaking.

There are several reasons for wanting to be able to make changes to ROM code after the ROM is produced. In some cases, electronic products are often developed in short time frames and released without exhaustive testing, therefore 'bugs' or defects in the ROM code may be discovered after products have been released on the market. Other circumstances such as a change in operating parameters or conflicting hardware or software may necessitate later alteration of the operating code residing in the ROM. As previously mentioned, it is impractical, laborious and expensive to recall products to manually change the ROM.

With reference to FIG. 1, a known prior art technique of implementing ROM code correction is performed by replacing a piece of ROM-based code with a patch program stored in RAM. FIG. 1 shows a schematic block diagram of a prior-art patch code correcting apparatus. The ROM patch code logic includes eight patch address registers 14 and eight patch address comparators 16. Each patch address register 14 points to a starting location in the ROM code where the program flow is to be changed. The Program Counter (PC) register in a Program Control Unit is compared to each patch address register. When a comparator determines that the address of a fetched instruction is identical to an address stored in one of the patch address registers, the data bus 10 is forced to the corresponding JMP instruction by JMP Target Address Generator 20.

The patch address register 14 contents are compared with the address bus 12 used to initiate the program fetch. When the address in the patch address registers 14 is equal to the contents of one of the patch address registers, a PATCH DETECTED signal 24 is generated that injects a JMP instruction into the data bus 10, replacing the instruction that otherwise would have been fetched from the ROM. The JMP target address is determined according to the identity of the comparator that generated the PATCH DETECTED signal 24. The JMP target can be any one of the predetermined locations in the program memory space stored by RAM 22. The specific target address is mask-programmable. A user may download a piece of patch code to one of the predetermined target locations in RAM 22.

As may be seen from FIG. 1, the prior art ROM patch code scheme requires a comparator for each block of patch code that is provisioned. For each block of patch code, an input on the OR gate and on the JMP target address generator is required. This scheme is inefficient because it provides for a fixed and limited number of patch code opportunities. A further inefficiency of the prior art scheme is that if the chip designers provide more patch code blocks, an increasingly large area of the silicon is required, therefore using valuable chip area that may be used for other circuitry. Also, as more comparators are operating on the chip, more power is required to drive them, which for battery-operated devices, is not desirable. Thus, in the past, there has been a trade off between providing a limited number of ROM code patch memory blocks with power conservation considerations, and silicon space considerations.

Therefore, a need exists for a method and apparatus of patching ROM code without the above-referenced limitations.

BRIEF SUMMARY OF THE INVENTION

A method for patching Read Only Memory (ROM) code according to one embodiment includes executing an instruction set from ROM, which further includes loading a Random Access Memory (RAM) index stored in the ROM into a memory map, loading a ROM return address stored in the ROM into the memory map, and jumping a program counter to a first reserved ROM address in the ROM. When the program counter is at the first reserved ROM address, the method includes retrieving the RAM index from the memory map, jumping the program counter to RAM based on the RAM index to execute a patch code within the RAM in which the patch code includes at least an instruction to set the program counter to a second reserved ROM address in the ROM, and when the program counter is at the second reserved ROM address in the ROM, retrieving the ROM return address from the memory map.

A digital data processing system according to one embodiment includes a processing core, a program counter, a ROM, and a RAM. The ROM includes at least one reserved patch memory block in which each stores a load RAM index instruction and a corresponding load RAM index, a load ROM return address instruction, a corresponding load ROM return address, and a jump to a reserved ROM address instruction. The processing core has an execute instructions from ROM state, an update program counter state, and an execute instructions from RAM state. The processing core transitions from the execute instructions from ROM state to the update program counter state when the program counter corresponds to a first reserved ROM address or a second reserved ROM address. The processing core transitions from the update program counter state to the execute instructions from RAM state when the program counter corresponds to the RAM index. A ROM according to one embodiment includes a reserved section and multiple reserved patch memory blocks. The reserved section has a first reserved block and a second reserved block, in which the first reserved block stores at least one instruction for accessing a RAM index from a memory map, and in which the second reserved block stores at least one instruction for jumping to a ROM return address that is stored in the memory map. Each reserved patch memory blocks includes a load RAM index instruction for loading the RAM index into the memory map, a load ROM return address instruction for loading the ROM return address into the memory map, and a jump to the first reserved block instruction.

A method of operating a processing module while executing an instruction set stored in ROM according to one embodiment includes loading a RAM index stored in the ROM into a memory map, loading a ROM return address stored in the ROM into the memory map, setting a program counter to a first reserved ROM address within the ROM, when the program counter is at the first reserved ROM address, retrieving the RAM index from the memory map, setting the program counter to an address in RAM corresponding to the RAM index, when the program counter is at a second reserved ROM address within the ROM, retrieving the ROM return address from the memory map, and setting the program counter to the ROM return address.

DETAILED DESCRIPTION OF THE INVENTION

Figure 2:
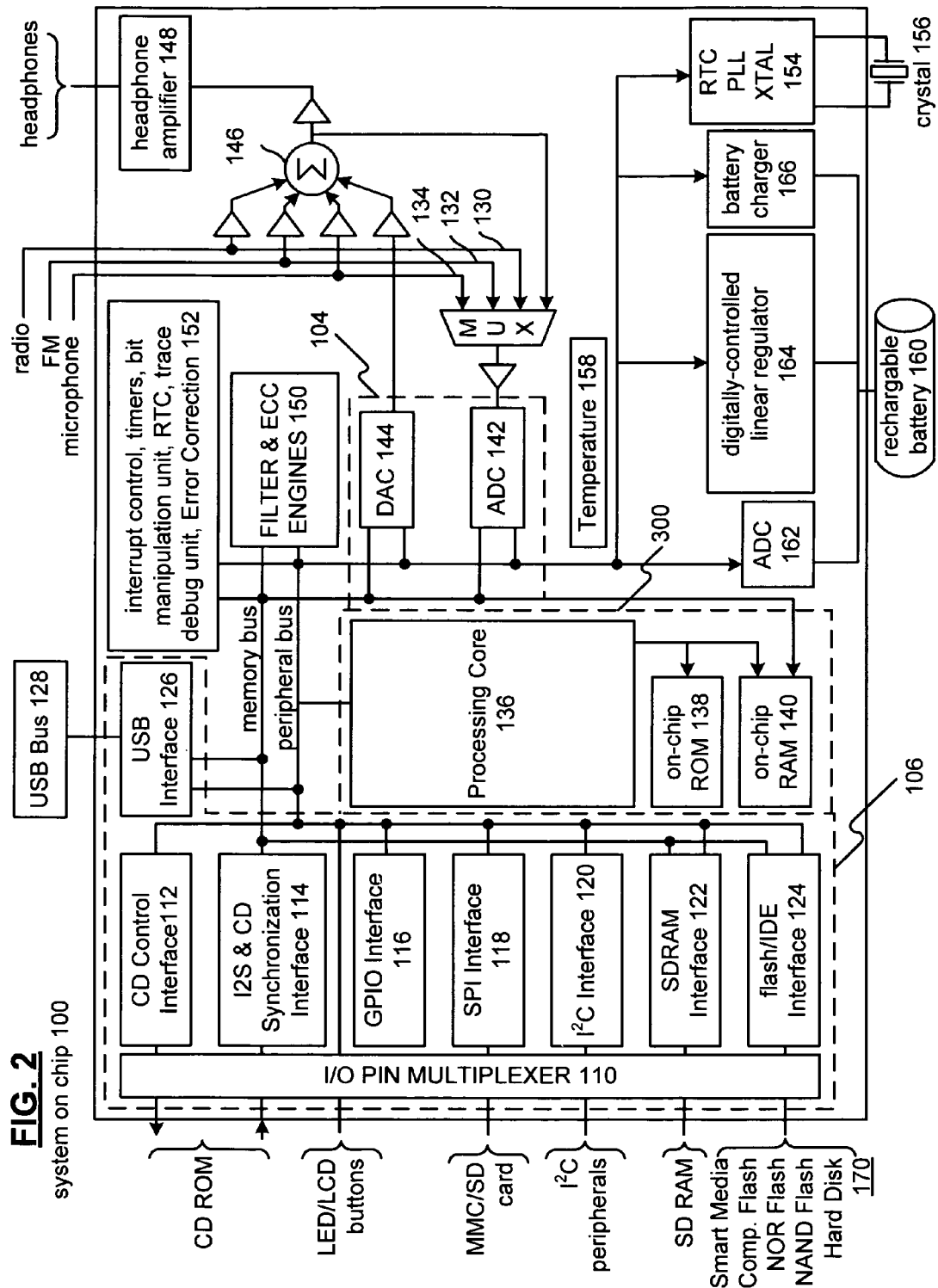
FIG. 2 illustrates a schematic block diagram of a processing system-on-a-chip in accordance with the present invention.

Referring to FIG. 2, an example system on chip integrated circuit (IC) 100 is shown in which one embodiment of the invention is implemented. The example IC 100 is a single IC chip that implements a multiple function system-on-a-chip. It is to be noted that the example embodiment of FIG. 2 implements a complete media system on a single chip, but other embodiments of the invention may incorporate one or more integrated circuit chips to provide a complete system or parts of a system.

As illustrated, a variety of blocks are noted within the IC 100. The various blocks exemplify hardware components, software and interfaces resident within IC 100. The example media system of IC 100 may operate with one or a variety of devices. Accordingly, a CD (compact disc); LED (Light Emitting Diode)/LCD (Liquid Crystal Display) displays, buttons and/or switches; MMC (Multimedia Card)/SD (Secure Digital) cards; IC (Inter-Integrated Circuit) peripherals; SmartMedia, Compact Flash, NOR Flash, NAND Flash, and/or hard drive devices 170; and memory, such as SDRAM (Synchronous Dynamic Random Access Memory) are some components that may be coupled to IC 100 through the digital interface circuitry 106 is provided by an I/O (input/output) pin multiplexer 110. These various multiplexed connections are coupled to respective interfaces. These interfaces include CD control interface 112; I²S and CD synchronization interface 114; GPIO (General Purpose Input/Output) interface 116; SPI (Serial Peripheral Interface) interface 118; I²C interface 120; SDRAM interface 122; and Flash/IDE (Integrated Device Electronics) interface 124.

Furthermore, the digital interface circuitry 106 provides a Universal Serial Bus ("USB") interface 126 for the coupling of a USB connection external to the IC 100. The USB interface 126 provides compatibility with USB 2.0 specification, which is backwards compatible to a USB 1.1 specification. As should be readily appreciated, the USB interface 126 may be provided for interfacing with additional USB specifications or similar communications protocols as they become available. A microphone input, radio input and a line input are also available on IC 100 via the LINE IN 130, FM IN 132, and MIC IN 134 ports to allow interconnection to a microphone, radio, or other audio input.

The processing system 300 of the IC 100 includes a processing core 136, an on-chip ROM (Read Only Memory) 138, and an on-chip RAM (Random Access Memory) 140 processing core 136. The processing system 300 will be described in greater detail with reference to FIG. 3.

ROM 138 and RAM 140, may have 64 Mbytes or greater of storage capacity, although it will be appreciated by a person of ordinary skill in the art that the storage capacity may be more or less than 64 Mbytes. RAM 140 may also be used as a second level cache, where a bulk of the code that the processing module executes is stored off-chip in NAND flash, or other off-chip memory. The RAM 140, under the control of the processing module 300, retrieves a page or pages of instructions from the off-chip memory, where lines of the instructions are provided to the first level cache shown in FIG. 3. Data stored in ROM 138 and RAM 140, may be operation code, boot code, BIOS code, ROM patch code, text files, presentation files, user profile information for access to various computer services (for example, Internet access, email, etc.), digital audio files (for example, MP3 files, WMA—Windows Media Architecture—, MP3 PRO, Ogg Vorbis, AAC—Advanced Audio Coding), digital video files—for example, still images or motion video such as MPEG (motion picture expert group) files, JPEG (joint photographic expert group) files, etc.—address book information, and/or any other type of information that may be stored in a digital format.

The mixed signal circuitry 104 includes an analog-to-digital converter ("ADC") 142 and a digital-to-analog converter ("DAC") 144. The ADC 142 converts analog inputs in to a digital format for processing by processing core 136. The DAC 144 converts digital signals, into analog signals for output in analog form. For example, the DAC 144 output may be provided to the headphone amplifier 148 via a summing module 146.

Also included within the IC 100 is a filter and ECC (Error Correction Circuit) engines 150 to provide filtering and error correction operations. Other functions are shown within block 152 to provide various control and timing functions. These may include Interrupt Control, Timers, Bit Manipulation Unit, Real Time Clock (RTC), Trace Debug Unit, and error correction just to name a few of the operations.

Also within the IC 100 is a RTC PLL (Real Time Clock/Phase Lock Loop) circuit 154, which is operably coupled to an external crystal 156 to provide an accurate clocking signal for circuits of the IC 100. Memory and peripheral buses are also present within the IC 100 for transfer of data and signals. A temperature sensor circuit 158 is present to monitor the temperature of IC 100.

A rechargeable battery 160 is shown coupled to a lower resolution ADC 162, a digitally-controlled linear regulator 164, and a battery charger 166. The ADC 162 monitors the battery voltage to determine if the battery voltage is such that battery 160 may require charging or if the battery is fully charged. The ADC 162 may also monitor the battery voltage to determine if a battery is present. Thus, if the battery is not present or is removed during use, the IC 100 detects the absence of the battery through the monitoring provided by the ADC 162.

The digitally-controlled linear regulator 164 operates to convert the source voltage, such as a battery source or non-battery source, to an operative voltage utilized by the components of the IC 100. Also, the digitally-controlled linear regulator 164 operates to provide a regulated—that is, a substantially constant and steady—operative voltage(s) utilized by components of the IC 100. The battery charger 166 is utilized to charge the battery when an external voltage source is coupled to the IC 100.

A variety of batteries may be utilized for battery 160 and, as noted above, battery 160 is a rechargeable battery. Since the voltage from the battery may vary, and/or the circuitry may require voltages other than what is provided by the battery, the digitally-controlled linear regulator 164 may provide conversion of the battery voltage to one or more voltages utilized on the IC 100. External power may be provided through USB interface 126. Under the USB 2.0 protocol specification, for example, data transfer is specified by the use of differential data lines through a USB link, such as a USB bus 128.

Figure 3:
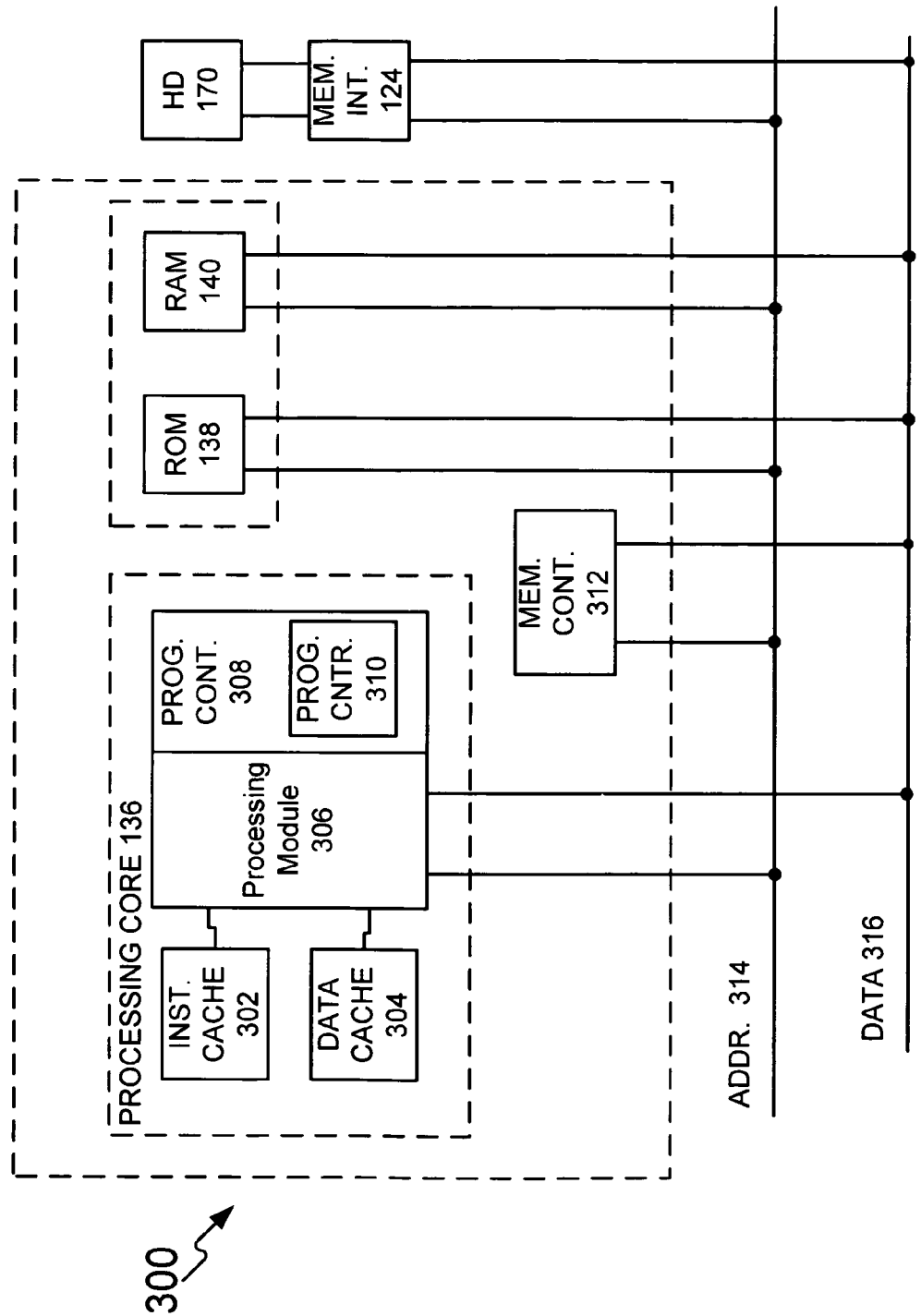
FIG. 3 illustrates a schematic block diagram of a processing system in accordance with the present invention.

FIG. 3 illustrates a schematic block diagram of an embodiment of a processing system 300 in accordance with the present invention. Processing system 300 includes processing core 136, a memory controller 312, ROM 138, and RAM 140. The processing system 300 is coupled to external memory (e.g., hard drive, NAND flash) 170 via a memory interface 124, an address bus 314, and a data bus 316. Processing core 136 includes a processing module 306, program controller 308, program counter 310, an instruction cache 302 and a data cache 304.

The processing module 306 may be a single processing device or a plurality of processing devices. Such a processing device may be a microprocessor micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. RAM 140 may be a single memory device or a plurality of memory devices. Such a memory device may be a volatile memory, non-volatile memory, static memory, dynamic memory, flash memory, cache memory, and/or any device that stores digital information. Memory controller 312 is a logic module that controls I/O (input/output) of data going to and coming from RAM 140 and ROM 138. Note that when the processing module 306 implements one or more of its functions via a state machine, analog circuitry, digital circuitry, and/or logic circuitry, the memory storing the corresponding operational instructions may be embedded within, or external to, the circuitry including the state machine, analog circuitry, digital circuitry, and/or logic circuitry. Further note that, the ROM 138, RAM 140 and external memory 170 may store, and the processing module 306 may execute, operational instructions corresponding to at least some of the steps and/or functions illustrated in FIGS. 2 to 7.

Figure 4:
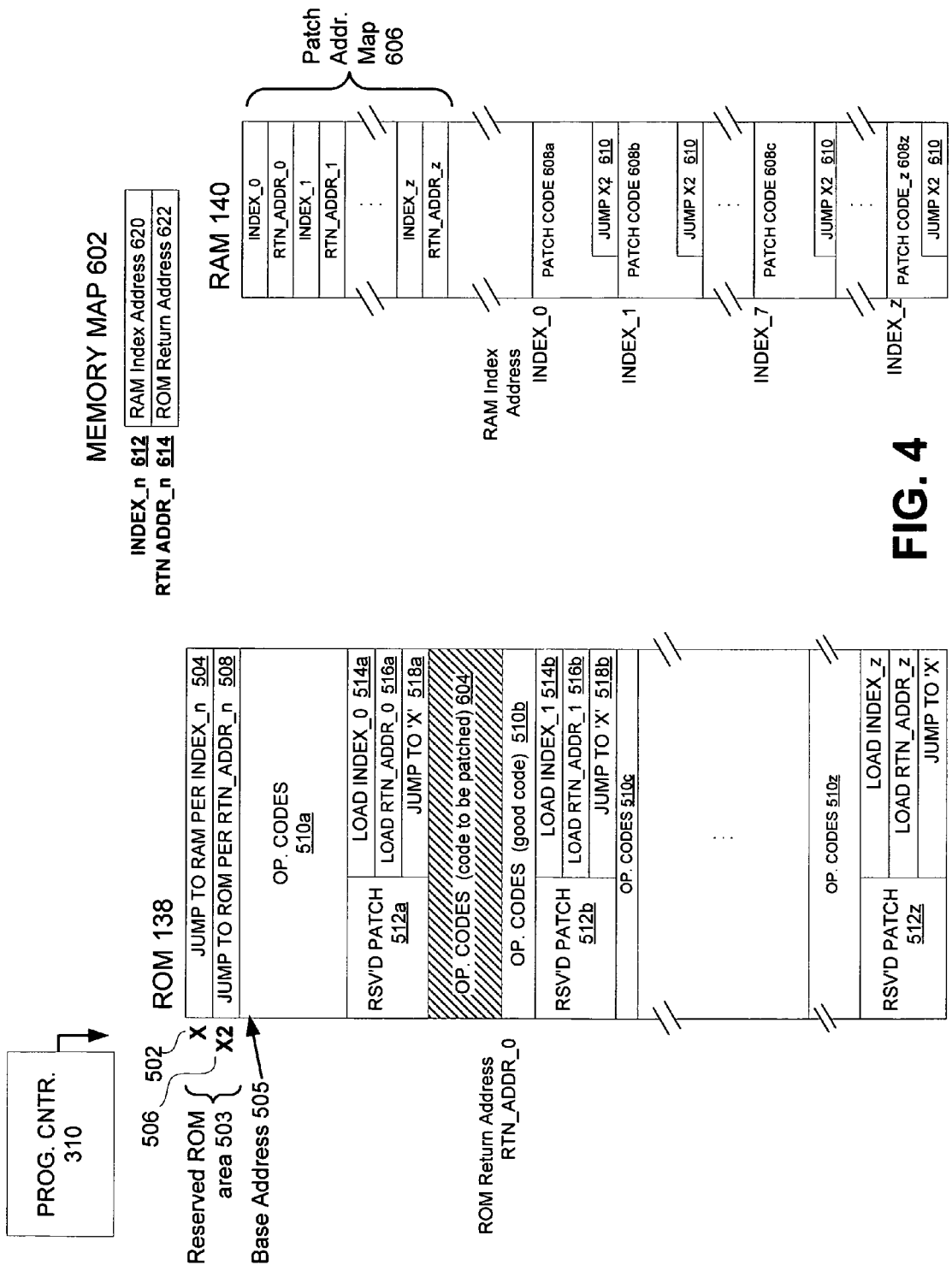
FIG. 4 illustrates a diagram of an embodiment of patching ROM code in accordance with the present invention.

FIG. 4 illustrates an example of patching ROM code according to an embodiment of the present invention. ROM 138 includes reserved ROM area 503, operational code (op. code) blocks 510*a* through 510*z*, and reserved patch memory blocks 512*a* through 512*z*. Reserved ROM area 503 is at a reserved location in ROM, including reserved ROM addresses 'X' 502 and 'X2' 506. At address 'X' 502, reserved ROM area 503 includes an instruction to jump to a RAM based on a RAM index address 504. At address 'X2' 506, reserved ROM area 503 includes an instruction to jump to a ROM based on a ROM return address 508.

Reserve patch memory blocks of ROM 512*a* through 512*z* each include an instruction to load a RAM index into a memory map 514*a-z*, an instruction to load a ROM return address into a memory map 516*a-z*, and an instruction to set (or jump) program counter 310 to a first reserved ROM address (address 'X' 502). As may be seen, there may be several reserve patch memory blocks of ROM that are placed at strategic locations in the ROM. Operational code 604 is illustrative of op. code to be patched. Op. code blocks 510*a* through 510*z* are illustrative of blocks of op. code that do not require patching.

When the processing core 136 accesses the ROM 138, which may be at start-up, the processing core 136 sets the program counter 310 to an initial address. In this example, the initial address corresponds to the base address 505 of the first section of op codes 510*a*, thus skipping the reserved ROM area 503. The program counter 310 increments its count through the ROM and the processing core executes the corresponding op codes (e.g. 510*a*) until it hits a reserved patch area 512 (e.g. 512*a*). When the reserved patch area 512 is reached, the processing core 136 executes the Load_Index_0 instruction 514, which may be a write instruction to write a RAM address into a memory map 602.

After executing the Load Index_0 instruction, the program counter 310 is incremented to the next ROM address, which is storing a Load Return_Address_0 instruction 516. The processing core 136 executes this instruction by writing a return to ROM address at a particular address 622 of the memory map 602. As one of ordinary skill in the art will appreciate, the memory map 602 may included in RAM 140, it may be a register, and/or a separate memory device.

After executing the Load Return_Address_0 instruction, the program counter 310 is incremented to the next ROM address, which is storing the Jump-to-X instruction 518. The processing core 136 executes this instruction by changing the program counter 310 to point to an address X 502 in the reserved ROM area 503. With the program counter 310 adjusted to address X 502, the processing core 136 executes the Jump-to-RAM per Index-n instruction 504. Per this instruction 504, the processing core 136 retrieves the RAM address that was just stored in the memory map and adjusts the program counter to this RAM address.

With the program counter 310 pointing to a RAM address, the processing core 136 performs the instructions stored in RAM. If, as for op code sections 510*a*, *b*, and *c* of this example, the ROM is not being patched for this jump to RAM section of the ROM, the patch code in RAM would include an instruction for the processing core 136 to access the memory map to retrieve the return to ROM address without other instructions. Per this instruction, the processing core 136 would adjust the program counter 310 based on the return to ROM address and continue executing ROM code until the next reserved patch area is encountered.

In this example, reserved path area is 512*b* follows ROM op codes 604 that are to be patched. In this instance, the processing core 136 executes the Load RAM_Index_1 and Load ROM_Return_Address_1 instructions to store the corresponding RAM address and the ROM return address in the memory map 602. The processing core 136 then executes the Jump-to-X instruction, which adjusts the program counter 310 to ROM address X 502. The processing core 136 executes the Jump-to-RAM instruction by retrieving the RAM address from the memory map and adjusting the program counter accordingly. In this example, since the op codes 604 requires patching, the RAM will store more than just a return to ROM instruction.

With the program counter 310 pointing to Index_1 address of the RAM, the processing core 136 begins to execute the patch code 608b. When the program counter 310 reaches the Jump-to-X2 instruction 610, the processing core 136 retrieves the return to ROM address 622 from the memory map 602 and adjusts the program counter accordingly. Once the program counter is adjusted, the processing core 136 resumes processing the op codes from ROM until the next reserved patch area is encountered.

For each encountering of a reserved patch area of ROM, the processing core 136 performs the same functions: store a RAM index address in the memory map; store a return to ROM address in the memory map; jump to address X of the ROM, execute the jump to RAM at the stored RAM index address; execute, if any, the patch code in RAM; and return to ROM based on the return to ROM address stored in the memory map.

As is apparent from the description, this invention does not limit the number of reserve patch memory blocks to a limited number of available comparators, unlike the prior art scheme. As one of ordinary skill in the art will appreciate, the number of reserved ROM patch areas may range from one to dozens or more depending on the application(s) in which the processing system 300 is used, the size of the ROM, and/or other design parameters. As one of ordinary skill in the art will appreciate, the reserved patch area may precede the op codes to be patched and/or follow the op codes to be patched.

Figure 5:
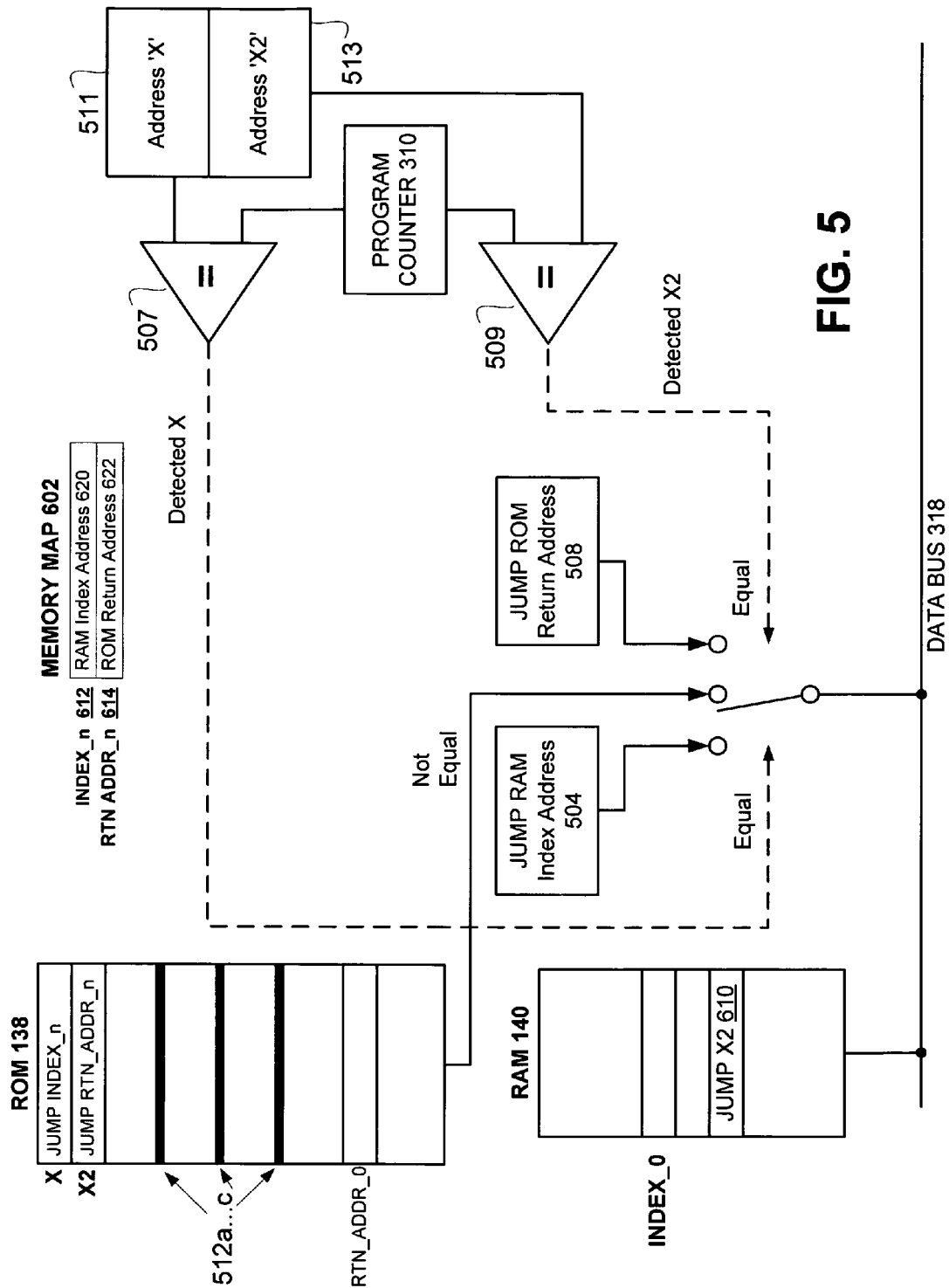
FIG. 5 illustrates a diagram of another embodiment patching ROM code in accordance with the present invention.

FIG. 5 illustrates another example of patching ROM code in accordance with the present invention. In this example, ROM 138, RAM 140, program counter 310, and memory map 602 have characteristics and elements similar to those described above with respect to FIG. 4. In this example, a register for storing a first reserved ROM address 511 is operably coupled to comparator 507, a register for storing a second reserved ROM address 513 is operably coupled to comparator 509, and comparators 507 and 509 are operably coupled to program counter 310.

Figure 1:
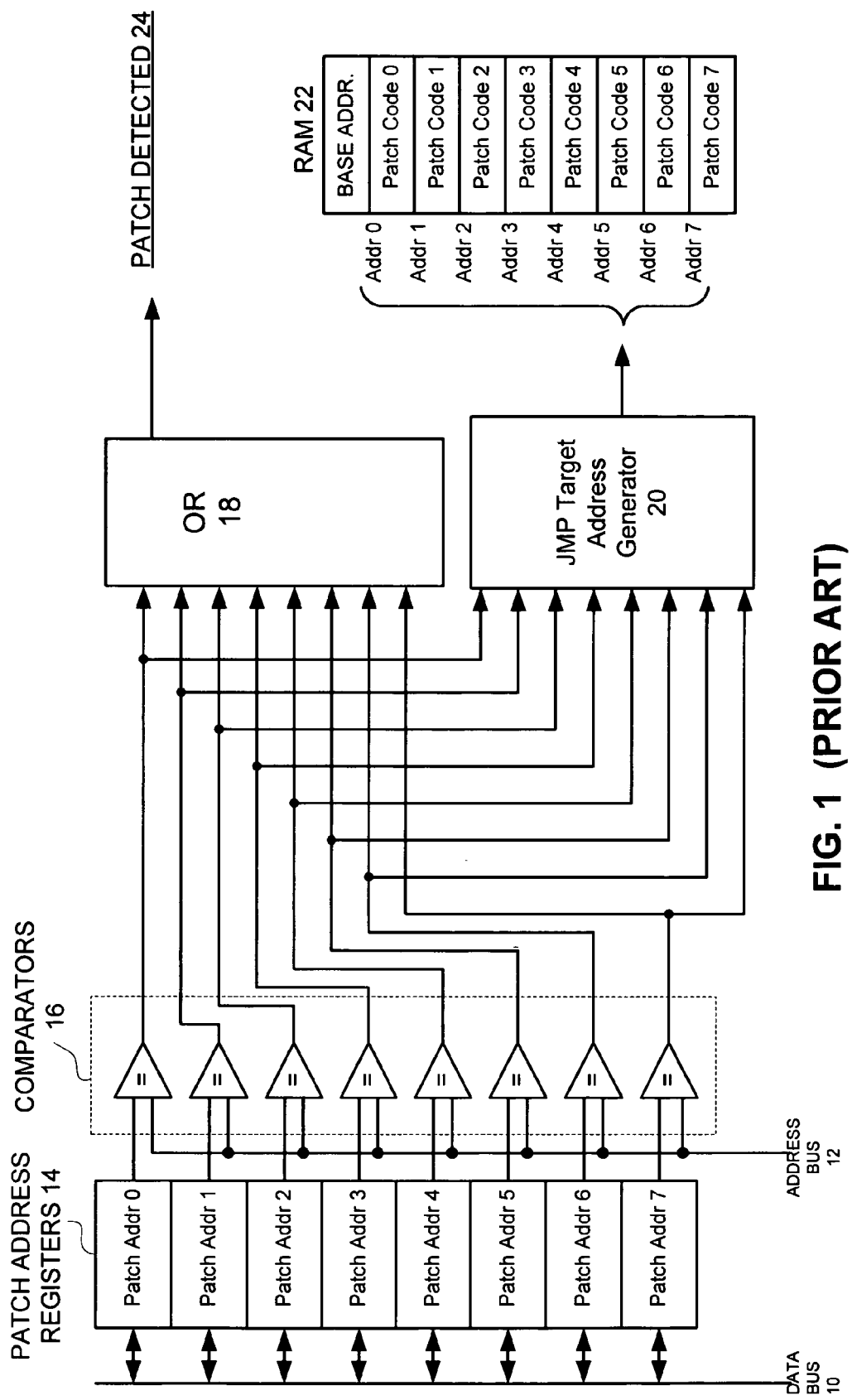
FIG. 1 shows a schematic block diagram of a prior-art patch code correcting apparatus.

Address 'X' 502 and the address 'X2' 506 are compared with the program counter (PC) 310 using comparators 507 and 509 respectively. When PC 310 does not equal address 'X' 502 or address 'X2' 506, the ROM code from ROM 138 is input onto address bus 314. However, when an address 'X' 502 or an address 'X2' 506 is detected by comparators 507 or 509, a signal that the respective address is detected causes a 'JUMP RAM index' address instruction 504 or a 'JUMP ROM Return Address' instruction to be injected on to the address bus 314, according to the detected address (X or X2). This causes PC 310 to be set to the RAM index address 620 or the ROM return address 622, depending on whether address 'X' 502 or 'X2' 506 is detected. As may be seen, this scheme requires only two comparators for an unlimited number of patch memory blocks, unlike the prior art scheme described in FIG. 1 that required a comparator for each patch memory block.

Figure 6:
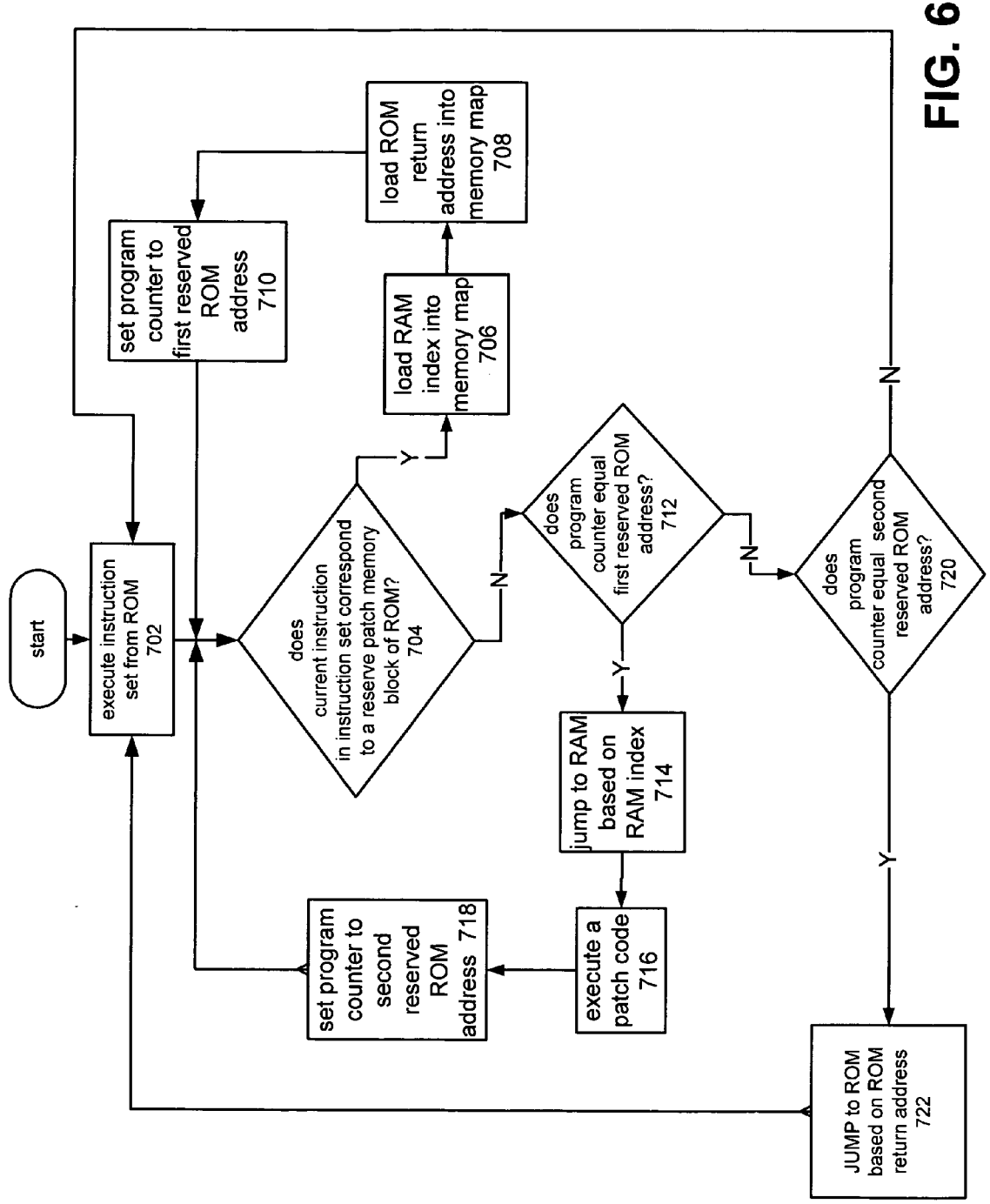
FIG. 6 illustrates a logic diagram of a method for patching ROM code in accordance with the present invention.

FIG. 6 illustrates a logic diagram of a method for patching ROM code in accordance with the present invention. An instruction of an instruction set from ROM at step 702, which includes updating a program counter for a next instruction in the instruction set. When the current instruction in the instruction set corresponds to a reserve patch memory block of ROM at step 704, then the processing core executes an instruction to load a RAM index into a memory map at step 706 and to load a ROM return address into the memory map at step 708. Subsequently, a program counter is set to a first reserved ROM address at step 710. The process returns to step 704, where, in this instance, the current instruction corresponds to the instruction stored at the first reserved ROM address and thus does not correspond to a reserve patch memory block of ROM, which causes the process to proceed to step 712.

When the program counter equals the first reserved ROM address at step 712, the program counter is jumped to RAM based on the RAM index stored in the memory map, at step 714. A patch code is executed from RAM at step 716. Following execution of the patch code, the program counter is set to a second reserved ROM address at step 718 and the process reverts to step 704. Since, in this instance, the program counter corresponds to the second reserved ROM address, the negative path from steps 704 and 712 are followed to step 720.

When a program counter equals the second reserved ROM address at step 720, the instruction at the second reserved ROM address is executed, causing the program counter to jump to the ROM return address stored in the memory map, at step 722, and the instruction set continues to be executed from ROM at step 702. Note that when the program counter does not point to a reserved patch memory block, the first or second reserved ROM address, the process loops through the negative paths of 704, 712, and 720 to execute instructions from the ROM at step 702.

Figure 7:
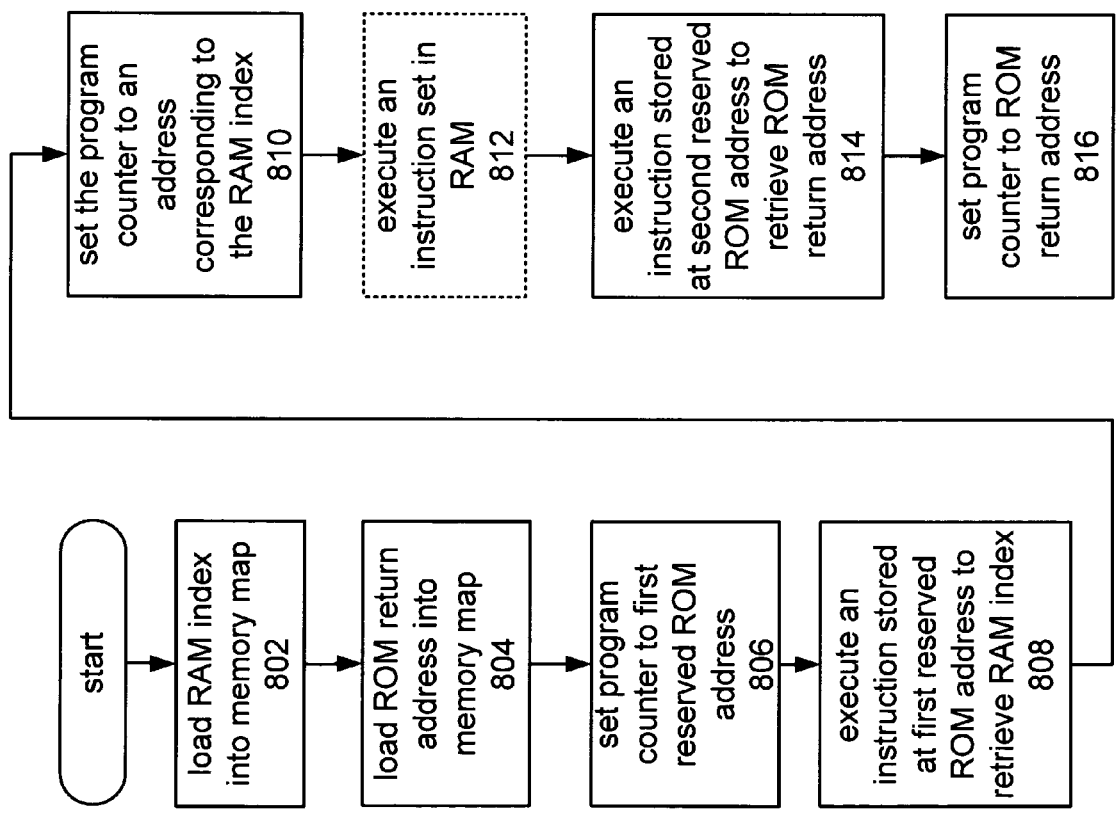
FIG. 7 illustrates a logic diagram of an instruction set in ROM in accordance with the present invention.

FIG. 7 illustrates a logic diagram of an instruction set in ROM in accordance with the present invention. The instruction set in ROM, when executed, causes a processing core to load a RAM index into a memory map at step 802. The instruction set also causes the processing core to load a ROM return address into the memory map at step 804. The instruction set further causes the processing core to set a program counter to a first reserved ROM address at step 806, and execute at least one instruction stored at the first reserved ROM address to retrieve the RAM index from the memory map at step 808. At step 810, the instruction set in ROM causes the processing core to set the program counter to an address corresponding to the RAM index. An instruction set in RAM may then be executed at step 812. The instruction set in RAM, when executed, may also cause the processing core to execute at least one instruction stored at a second reserved ROM address to retrieve the ROM return address from the memory map at step 814 and set the program counter to the ROM return address at step 816. As will be appreciated by a person of ordinary skill in the art, the instruction set in ROM may be ordered differently to the above description and may add or remove instructions in accordance with the scope of the present invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal. While the memory structures in the above described figure(s) is/are shown as ROM and RAM, as one of ordinary skill in the art will appreciate, ROM refers to memory that may only be read from by a processing module, and RAM refers to memory that may be written to and read from by a processing module. RAM may be implemented using any type of memory structure including, but not limited to, random access memory, volatile memory, non-volatile memory, static memory, flip flops, registers, dynamic memory, flash memory, cache memory, and/or any device that stores digital information.

The preceding discussion has presented a method, apparatus and system for patching ROM code. As is apparent from the description, this invention does not limit the number of reserve patch memory blocks to a limited number of available comparators, unlike the prior art scheme. Accordingly, as one of ordinary skill in the art will appreciate, the number of reserved ROM patch areas may range from one to dozens or more depending on the application(s) in which a processing system is used, the size of the ROM, and/or other design parameters.

What is claimed is:

1. A method for patching Read Only Memory (ROM) code comprising:
    executing an instruction set from ROM;
    during said executing, loading a Random Access Memory (RAM) index which is stored in the ROM into a memory map;
    during said executing, loading a ROM return address which is stored in the ROM into the memory map;
    during said executing, jumping a program counter to a first reserved ROM address in the ROM;
    when the program counter is at the first reserved ROM address, retrieving the RAM index from the memory map;
    jumping the program counter to RAM based on the RAM index to execute a patch code within the RAM, wherein the patch code includes at least an instruction to set the program counter to a second reserved ROM address in the ROM; and
    when the program counter is at the second reserved ROM address in the ROM, retrieving the ROM return address from the memory map.

2. The method of claim 1 further comprising the step of:
    jumping the program counter to the ROM return address, and continuing executing the instruction set from the ROM based on the ROM return address.

3. The method of claim 1, wherein the executing an instruction set from ROM comprising:
    incrementing the program counter.

4. The method of claim 1 wherein the instruction set comprises instructions for operation of a media device.

5. The method of claim 4, wherein the media device comprises one of:
    an audio player, a video player, a digital video recorder, a personal digital assistant, a cellular phone, and a personal computer.

6. The method of claim 1, further comprises the step of:
    storing the memory map in the RAM.

7. The method of claim 1, wherein the ROM stores a plurality of reserved patch memory blocks.

8. The method of claim 7, wherein for each of the plurality of reserved patch memory blocks, said method comprises:
    said loading a RAM index comprising executing a load RAM index instruction stored in ROM;
    said loading a ROM return address comprising executing a load ROM return address instruction stored in ROM; and
    said jumping a program counter to a first reserved ROM address comprising executing a jump to a reserved ROM address instruction stored in ROM.

9. A digital data processing system comprising:
    a processing core;
    a program counter;
    a Read Only Memory (ROM), comprising at least one reserved patch memory blocks wherein each reserved patch memory blocks stores a load RAM index instruction and stores a corresponding load RAM index, stores a load ROM return address instruction and stores a corresponding load ROM return address, and stores a jump to a reserved ROM address instruction;
    a Random Access Memory (RAM);
    wherein the processing core has an execute instructions from ROM state, an update program counter state, and an execute instructions from RAM state;
    wherein the processing core transitions from the execute instructions from ROM state to the update program counter state when the program counter corresponds to a first reserved ROM address or a second reserved ROM address; and
    wherein the processing core transitions from the update program counter state to the execute instructions from RAM state when the program counter corresponds to said load RAM index.

10. The digital data processing system of claim 9, further comprising a memory map for storing:
    said load RAM index; and
    said load ROM return address.

11. The digital data processing system of claim 10, wherein the load RAM index is loaded into said memory map by said load RAM index instruction when executed from ROM and wherein said ROM return address is loaded into said memory map by said load ROM return address instruction when executed from ROM.

12. The digital data processing system of claim 9, further comprising:
    a first comparator for determining whether the program counter corresponds to one of the first reserved ROM address and the second reserved ROM address.

13. The digital data processing system of claim 9, further comprising:
    a second comparator for determining whether the program counter corresponds to the RAM index.

14. The digital data processing system of claim 9, wherein the processing core functions to execute an instruction set from ROM;
    when in the execute instructions from ROM state and when a current instruction in the instruction set corresponds to a reserved patch memory block of ROM:
    loading said RAM index into a memory map;
    loading said ROM return address into the memory map; and
    jumping said program counter to a first reserved ROM address.

15. A Read Only Memory (ROM) comprises:

a reserved section having a first reserved block and a second reserved block, wherein the first reserved block stores at least one instruction for accessing a Random Access Memory (RAM) index from a memory map and wherein the second reserved block stores at least one instruction for jumping to a ROM return address that is stored in the memory map;

a plurality of reserved patch memory blocks, wherein each of the plurality of reserved patch memory blocks includes:

a load RAM index instruction for loading the RAM index into the memory map;

a load ROM return address instruction for loading the ROM return address into the memory map; and a jump to the first reserved block instruction.

16. A method of operating a processing module while executing an instruction set stored in Read Only Memory (ROM), comprising:

loading a Random Access Memory (RAM) index stored in the ROM into a memory map;

loading a ROM return address stored in the ROM into the memory map;

setting a program counter to a first reserved ROM address within the ROM;

when the program counter is at the first reserved ROM address, retrieving the RAM index from the memory map;

setting the program counter to an address in RAM corresponding to the RAM index;

when the program counter is at a second reserved ROM address within the ROM, retrieving the ROM return address from the memory map; and setting the program counter to the ROM return address.

17. The method of claim 16, further comprising the processing module executing instructions for operating a media device.

18. The method of claim 17, wherein the media device comprises one of an audio player, a video player, a digital video recorder, a personal digital assistant, a cellular phone, and a personal computer.

19. The method of claim 1, wherein said retrieving the RAM index from the memory map comprises executing an instruction stored at the first reserved ROM address in the ROM.

20. The method of claim 1, wherein said retrieving the RAM index from the memory map comprises injecting a jump instruction to a location in RAM corresponding to the RAM index.

* * * * *